United States Patent [19]

Baba et al.

[11] Patent Number: 5,222,392
[45] Date of Patent: Jun. 29, 1993

[54] CONTROL SYSTEM WITH MISFIRE DETECTION FUNCTION FOR INTERNAL COMBUSTION ENGINE

[75] Inventors: Yasutoshi Baba, Oobu; Masaaki Nakayama, Toyoake; Hideki Yukumoto, Oobu, all of Japan

[73] Assignee: Nippondenso Co., Ltd., Kariya, Japan

[21] Appl. No.: 764,340

[22] Filed: Sep. 23, 1991

[30] Foreign Application Priority Data

| Sep. 21, 1990 | [JP] | Japan | 2-253494 |
| Sep. 21, 1990 | [JP] | Japan | 2-253495 |
| Jul. 26, 1991 | [JP] | Japan | 2-187439 |
| Jul. 26, 1991 | [JP] | Japan | 3-187610 |

[51] Int. Cl.⁵ .................................. G01M 15/00
[52] U.S. Cl. .................................... 73/116
[58] Field of Search ............. 73/116, 117.3, 35; 364/431.08

[56] References Cited

U.S. PATENT DOCUMENTS

| 4,932,379 | 6/1990 | Tang et al. | 73/117.3 |
| 5,041,980 | 8/1991 | Maddock et al. | 73/116 |
| 5,044,195 | 9/1991 | James et al. | 73/117.3 |

FOREIGN PATENT DOCUMENTS 58-19532 2/1983 Japan.
58-51243 3/1983 Japan.

Primary Examiner—Robert Raevis
Attorney, Agent, or Firm—Cushman, Darby & Cushman

[57] ABSTRACT

A control system equipped with a misfire detection apparatus for an internal combustion engine comprising a first storage for storing a data train indicative of a record of a predetermined number of the operation states detected at a predetermined interval and a second storage for storing a reference data train indicative of a reference record of a predetermined number of reference operation states. The misfire detection apparatus further includes a comparison calculator for comparing each data constituting the data train stored in the first storage with each data constituting the reference data train stored in the second storage to obtain a comparison result between the entire data train and the entire reference data train. The comparison result supplied to a decision section to decide that the engine is in a predetermined state when the comparison result is out of a predetermined range.

5 Claims, 12 Drawing Sheets

CONTROL SYSTEM WITH MISFIRE DETECTION FUNCTION FOR INTERNAL COMBUSTION ENGINE

BACKGROUND OF THE INVENTION

The present invention relates to a control system for use in multi-cylinder internal combustion engines, and more particularly to a misfire detection apparatus for detecting the occurrence of misfire in the internal combustion engine.

A known system for detecting misfire in an internal combustion engine is known an apparatus arranged to detect the rotational speeds of a crankshaft before and after the expansion stroke of a reciprocating internal combustion engine and to determine a misfire when the difference between the detected rotational speeds is below a predetermined value, as disclosed in the Japanese Patent Provisional Publication No. 58-19532. More specifically, on the basis of the fact that the crankshaft speed in the expansion stroke is higher than the crankshaft speed in the compression stroke when the engine is in the normal ignition state and the difference therebetween substantially becomes zero in response to occurrence of the misfire, the misfire is determined when the rotational speed difference is below a predetermined value, i.e., when the crankshaft is not accelerated in the expansion stroke. Further, as disclosed in the Japanese Patent provisional Publication No. 58-51243, another known technique involves detecting the fluctuation of the engine speed so as to calculate the standard deviation to determine the misfire of the engine when the standard deviation is great.

There is a problem which arises with such apparatus, however, in that the crankshaft rotational speed becomes unstable when a motor vehicle runs on a irregular road surface whereby there is the possibility that the misfire is determined in error irrespective of the normal ignition. That is, the contact state between the wheel and the road surface becomes unstable due to the irregularity of the road and causes the load on the internal combustion engine to vary, impeding the normal rotation of the crankshaft. In addition, the impediment of the normal crankshaft rotation causes rotation fluctuation, making it difficult to accurately detect the misfire of the internal combustion engine.

SUMMARY OF THE INVENTION

It is therefore an object of the present invention to provide a misfire detection apparatus which is capable of accurately and surely detecting the misfire even if the motor vehicle is running on an irregular road surface.

A control system for an internal combustion engine according to this invention is equipped with a misfire detection apparatus comprising a first storage means for storing a data train indicative of a record of a predetermined number of the operation states detected at a predetermined interval and a second storage means for storing a reference data train indicative of a reference record of a predetermined number of reference operation states. The misfire detection apparatus further includes a comparison calculator for comparing each data constituting the data train stored in the first storage means with each data constituting the reference data train stored in the second storage means to obtain a comparison result between the entire data train and the entire reference data train. The comparison result is supplied to a decision section which decides that the engine is in a predetermined state when the comparison result is out of a predetermined range. Preferably, the reference data train is produced on the basis of the data train stored in the first storage.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
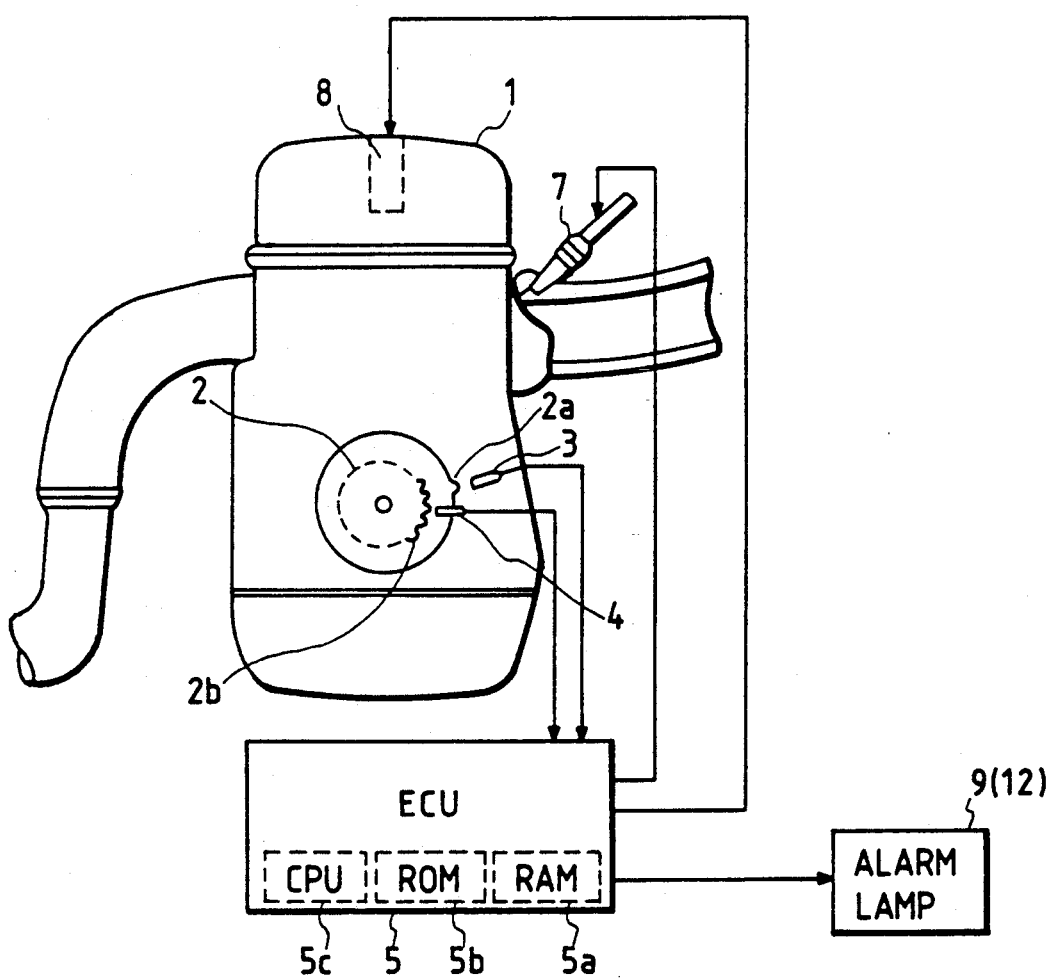
FIG. 1 is a block diagram showing an arrangement of a misfire detection apparatus according to the present invention which is incorporated in to an internal combustion engine.

Referring now to FIG. 1, there is illustrated a misfire detection apparatus according to a first embodiment of the present invention which is incorporated into a four-cylinder and four-cycle internal combustion engine. In FIG. 1, illustrated at numeral 1 is an internal combustion engine and illustrated at 2 is a crank pulley attached to a crankshaft (not shown) and equipped with a projection 2a formed at a reference crank position and projections 2b formed at a predetermined crank-angular internal (for example, 30° CA). Further, numeral 3 represents a crank position sensor attached to an engine block for generating one signal indicative of the reference crank position in connection with the projection 2a of the crank pulley 2 at every revolution of the crankshaft for the detection of the reference crank position, and 4 designates a crank-angle sensor attached to the engine block for generating one signal at every predetermined crank angle (in this embodiment, 30° CA) in connection with the projections 2b of the crank pulley 2 for the detection of the crank angle. In addition, there are provided an electronic control unit (ECU) 5 for detecting misfire on the basis of the signals from the crank position sensor 3 and the crank angle sensor 4 and outputting signals to an injector 7 and an igniter 8 to control the fuel injection amount, ignition timing and the like. The ECU 5 includes a central processing unit (CPU) 5c, a storage device such as a random access memory (RAM) 5a and a read-only memory (ROM) 5b.

Figure 2:
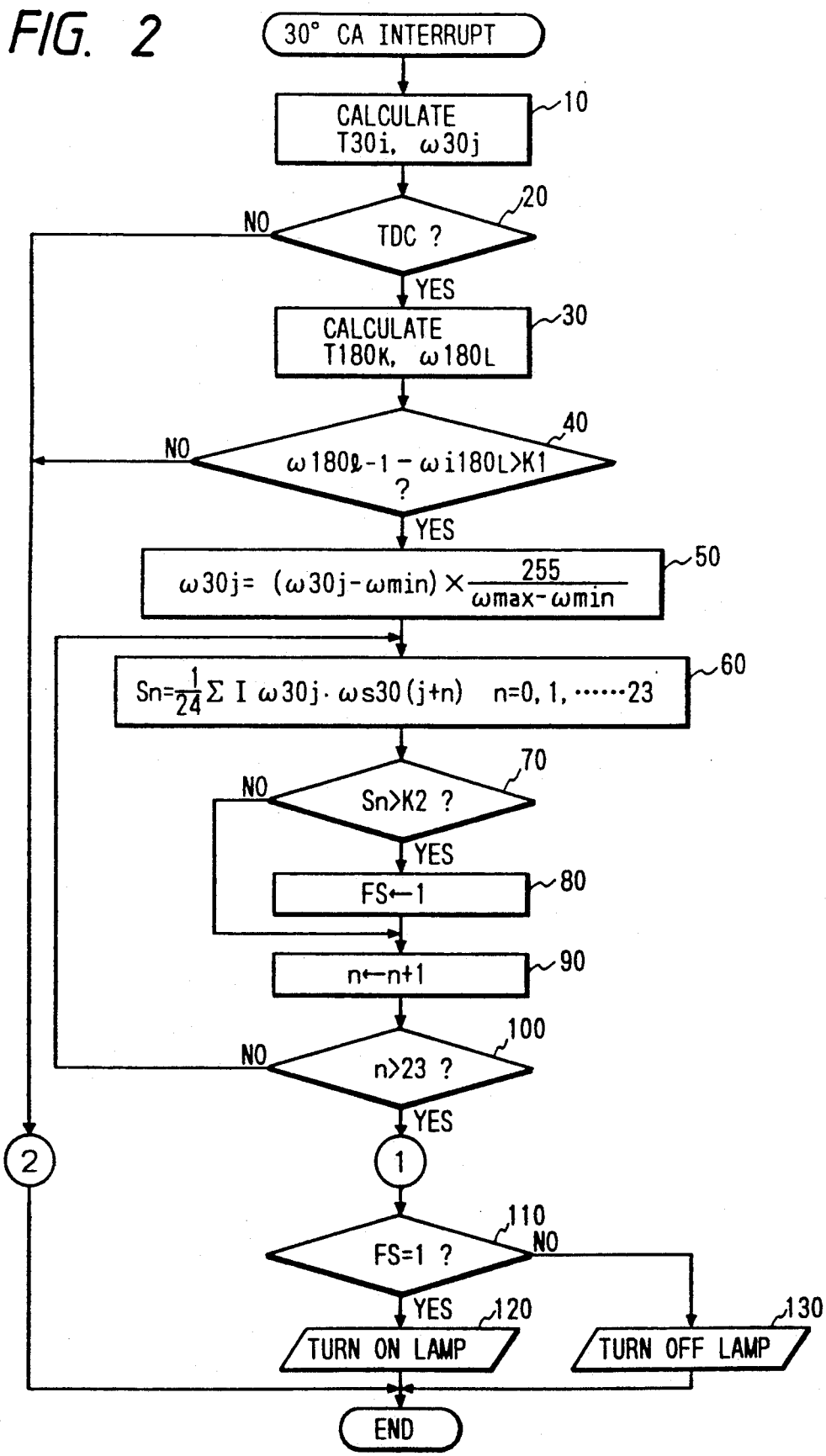
FIG. 2 is a flow chart for describing an operation of a misfire detection apparatus according to a first embodiment of the present invention.

Secondly, a description will be made hereinbelow with reference to a flow chart of FIG. 2 in terms of operation for the misfire detection to be executed by the ECU 5. This routine is executed by the interrupt occurring in response to the signal to be inputted from the crank angle sensor 4 at every 30° CA. In FIG. 2, the operation starts with a step 10 to calculate the time T30i necessary for the rotation of 30° CA immediately after the occurrence of the interrupt, on the basis of the difference between the previous interrupt time and the present interrupt time. Step 10 further calaulates an instantaneous rotational speed $\omega 30j$ on the basis of the calculated time T30i. The calculated time T30i and speed $\omega 30j$ are respectively stored in the RAM 5a (first storage means) of the ECU 5. In the RAM 5a there are always stored the latest 48 instantaneous rotational speed data $\omega 30j$ (j=1, 2, ..., 48) which correspond to the previous 4 revolutions of the internal combustion engine 1. Similarly, the latest 6 time data T30i (i=1, 2, ..., 6) are stored in the RAM 5a. A subsequent step 20 is provided in order to determine, on the basis of the signals from the crank position sensor 3 and the crank angle sensor 4, whether each cylinder is at the top dead center (TDC) in timing. This routine terminates when all the four cylinders do not take the TDC timings. On the other hand, in the case of the determination of the TDC timing, a step 30 follows in order to calculate the time T180k taken for the revolution of 180° CA in the past in accordance with the following equation (1)

$$T180k = \Sigma T30i \quad (1)$$

where $\Sigma$ represents the accumulation of i=1 to 6.

The rotational speed $\omega 180_L$ for 180° CA is obtained on the basis of the calculated time T180K. This rotational speed $\omega 180_L$ reflects the torque generated in the previous combustion stroke.

In a subsequent step 40, the deviation between the rotational speed $\omega 180_{L-1}$ obtained at the previous TDC timing and the rotational speed $\omega 180_L$ obtained at the current TDC timing is compared with a predetermined value K1, determined by the rotational speed of the engine. When the deviation therebetween is greater than the predetermined value K1, a determination is made that the rotational speed has decreased greatly and there is the possibility that misfire has occurred, thereby causing the operational flow to advance to the next step 50. On the other hand, if the deviation is smaller than K1, this routine terminates under the determination that there is no possibility of occurrence of misfire. Here, although the predetermined value K1 is determined in accordance with the rotational speed of the engine, value K1 is set to about 1% (50) of the rotational speed when the engine 1 is in a high-speed state (for example, 5000 rpm) and set to 10% (about 70) of the rotational speed when being in the idling state.

In the step 50, the maximum value $\omega_{max}$ and minimum value $\omega_{min}$ of the 48 latest instantaneous rotational speed data ($\omega 30j$ (j=1, 2, ..., 48)) stored in the RAM 5a are detected so as to normalize the 48 data on the basis of the detection values in accordance with the following equation (2), so that the maximum value assumes 255 (FF) counts and the minimum value takes 0 count.

$$\omega S30j = (\omega 30j - \omega_{min}) \times 255/(\omega_{max} - \omega_{min}) \quad (2)$$

where j=1, 2, ..., 48, and $\omega S30j$ represents the normalized instantaneous rotational speeds whose values are expressed with numerals 0 to 255.

Figure 3:
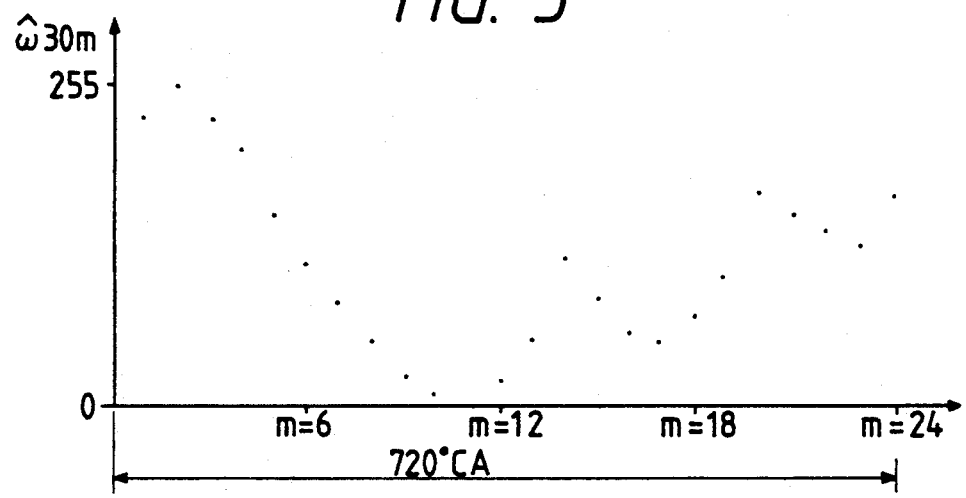
FIG. 3 is a graphic illustration of a rotation variation data train to be obtained at the time of the representative misfire.

Subsequently, a step 60 follows to calculate the cross-correlation function between the normalized $\omega S30j$ data and the normalized rotation variation data $I\omega 30$ at the time of the occurrence of the misfire which are stored in advance in the ROM 5b. Here, the number of the rotation variation data $I\omega 30m$ (m=1 to 24) is 24 in number and the data $I\omega 30m$ are indicative of the instantaneous rotational speeds to be obtained at every 30° CA over the interval of 720° CA. The distribution thereof is as shown in FIG. 3. The cross-correlation function Sn assumes a great value when the distribution shown in FIG. 3 is in a similar relation to the distribution determined by the normalized instantaneous rotational speed $\omega S30j$. The cross-correlation function Sn can be obtained in accordance with the following equation (3).

$$Sn = (\Sigma I\omega 30j \cdot \omega S30(j+1))/24 \quad (3)$$

where n=1, 2, ..., 23, and $\Sigma$ represents the accumulation of j=1 to 24.

Further, in a step 70, a comparison is performed between the cross-correlation function Sn (n=0) and a predetermined value K2 (for example, K2=10000), so as to determine the occurrence of misfire when Sn is greater than K2, thereafter proceeding to a step 80 to set a misfire determination flag FS and then advancing to a step 90. On the other hand, if the answer of the step 70 is negative, the operational flow jumps up to the step 90. In the step 90, a coefficient n is incremented by one. The step 90 is followed by a step 100 to check whether the coefficient n exceeds 23. If not, the operational flow returns to the above-mentioned step 60. If the answer of the step 100 is affirmative, that is, after the 24 cross-correlation functions Sn (n=0, 1, ..., 23) are calculated so that the misfire determination is made on the basis of each of the cross-correlation functions Sn, a step 110 is executed in order to check whether the misfire determination flag FS is in the set state. If the flag FS is set, a step 120 follows to light an alarm lamp 9 (see FIG. 1) to inform the operator or driver that misfire has occurred. On the other hand, if the answer of the step 110 is negative, the operational flow goes to a step 130 to turn off the alarm lamp 9 and then to terminate this routine. Here, although in the above-described steps 60 to 100, the 24 cross-correlation functions Sn are respectively calculated with n being changed from 0 to 23, in this case the instantaneous rotational speed $\omega S30j$ varies from $\omega S30_1$ to $\omega S30_{48}$ and this corresponds to the rotation variation data for the previous 4 revolutions.

Figure 4:
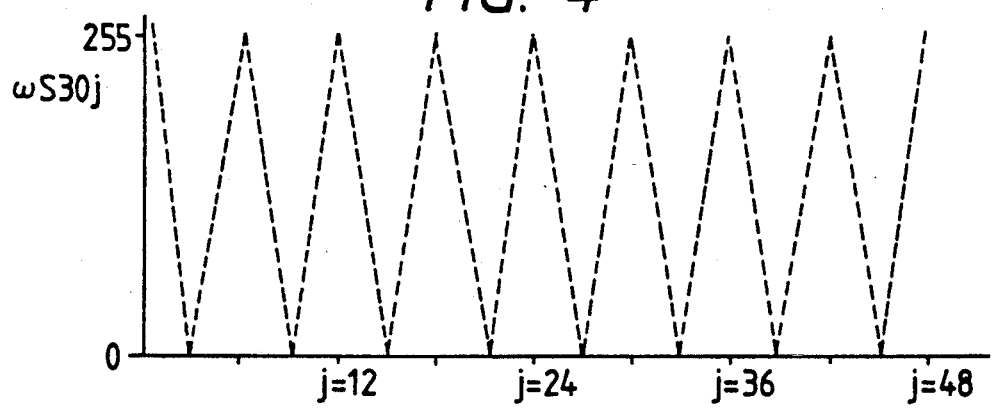
FIG. 4 is a graphic illustration of a rotation variation data train to be obtained at the time of the normal ignition.
Figure 5:
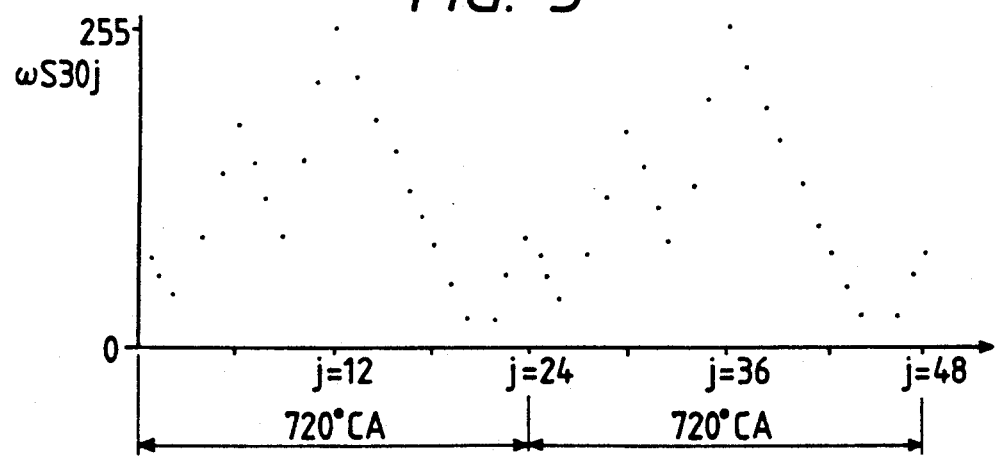
FIG. 5 is an illustration of a rotation variation data train at the time of occurrence of the misfire.

FIGS. 4 and 5 are illustrations of the distributions of $\omega S30j$ (j=1, 2, ..., 48), FIG. 4 showing the distribution of $\omega S30j$ at the time of the normal ignition and FIG. 5 illustrating the distribution of $\omega S30j$ at the time of the misfire. Here, for example, So (n=0) is the cross-correlation function between the rotation data train of $\omega S30_1$ to $\omega S30_{24}$ and the misfire data $I\omega 30j$ (j=1 to 24), and the rotation data train is shifted by one with n being changed by one from 0. Further, for example, Sl (n=1) is the cross-correlation function between the rotation data of $\omega S30_2$ to $\omega S30_{25}$ and the misfire data train $I\omega 30j$ (j=2 to 24).

In the case of the normal ignition shown in FIG. 4, even if n is changed from 0 to 23, it is not in a similar relation to the distribution of the misfire data train $I\omega 30$ illustrated in FIG. 3 and the cross-correlation function SN does not exceed the predetermined value K2. In the case of the occurrence of the misfire shown in FIG. 5, if n is changed from 0 to 23, when n=10, the rotation variation data train $\omega S30_{11}$ to $\omega S30_{34}$ is in a similar relation to the misfire variation data $I\omega 30_1$ to $I\omega 30_{24}$ and the cross-correlation function S10 exceeds the predetermined value K2.

In this embodiment the cross-correlation function is obtained by calculating the correlation degree between the actual rotation variation and the representative rotation variation at the time of the misfire. Because this calculation of the cross-correlation function applies a great load to the ECU 5, the correlation degree can also be obtained by calculating the sum of the deviations between the actual rotation variation and the typical rotation variation at the time of the misfire. The operation therefor will be described hereinbelow as a second embodiment of this invention. In case of the second embodiment, in the step 60 of the FIG. 2 flow chart the following equation (4) is effected instead of the equation (3).

$$Sn' = \Sigma |I\omega 30j - \omega S30(j+n))| \quad (4)$$

where $\Sigma$ represents the accumulation of j=1 to 24.

Figure 6:
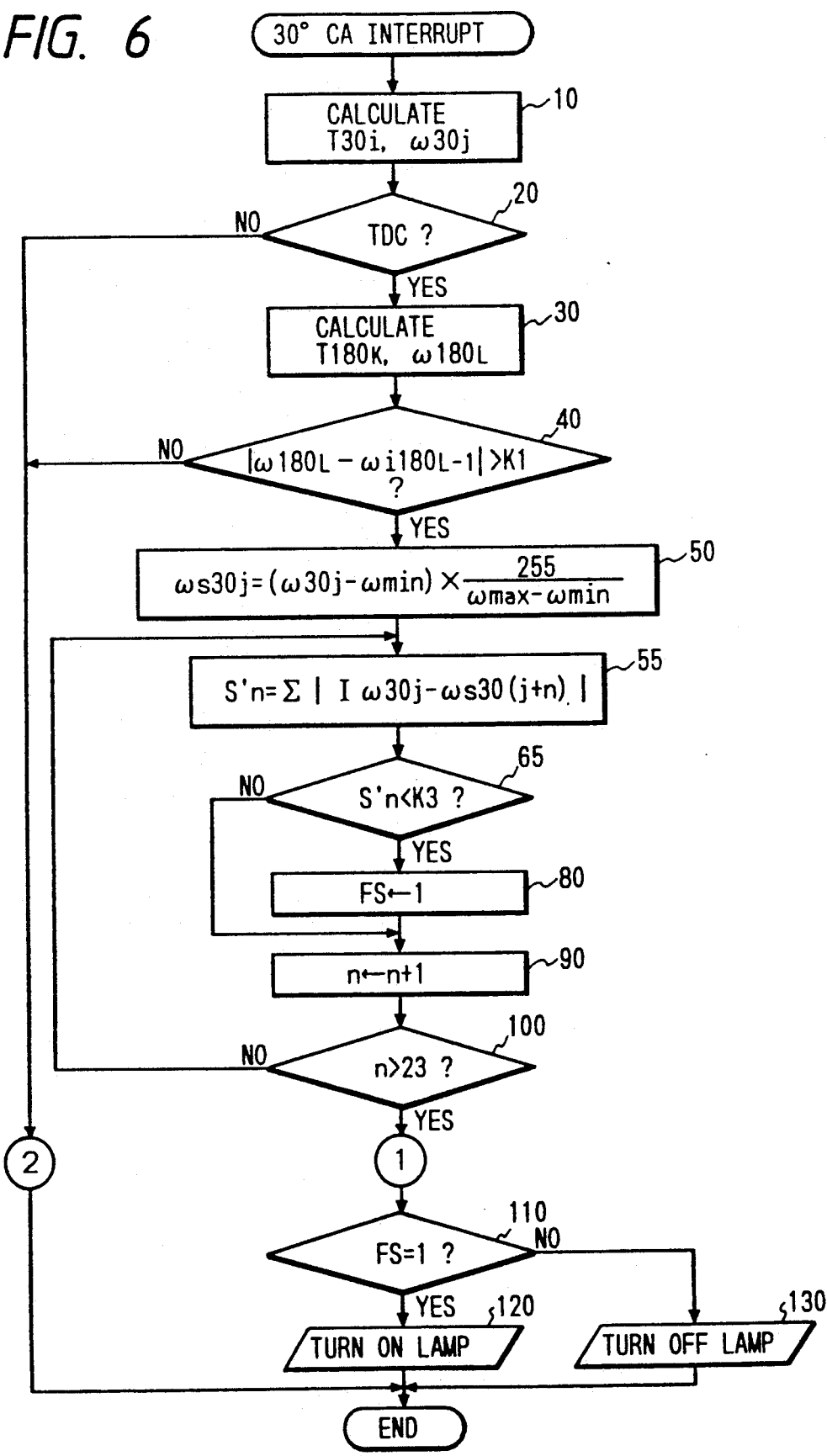
FIG. 6 is a flow chart showing an operation of a misfire detection apparatus according to a second embodiment of this invention.

FIG. 6 is a flow chart showing the operation in the second embodiment of this invention. In the FIG. 6 flow chart, steps 10 to 50 and 80 to 130 are the same as those in the FIG. 2 flow chart and hence the description thereof will be omitted for brevity. Only steps 55 and 65 are different therefrom. In the step 55, the correlation degree Sn' is derived on the basis of the sum of the deviations between the actual rotation variation and the representative rotation variation at the time of the misfire shown in FIG. 3, in accordance with the above-mentioned equation (4). This correlation degree Sn' assumes a small value when the actual rotation variation is in an equal or similar relation to the representative rotation variation at the time of the misfire. Further, in the step 65, the correlation degree Sn' is compared with a predetermined value K3 (for example, K3=100) so that the occurrence of misfire is determined when the correlation degree Sn' is smaller than the predetermined value K3, thereafter setting the misfire determination flag FS to "1" in the next step 80. On the other hand, when the correlation degree Sn' is greater than the predetermined value K3, the operation flow directly advances to a step 90 to increment the coefficient n by one and then proceeds to a step 100 to check whether the coefficient n exceeds 23. If exceeding 23, a step 110 follows to check whether FS=1. If FS=1, the alarm lamp 9 turns on in a step 120. If not, the operation goes to a step 130 to turn off the alarm lamp 9.

Here, since the correlation degree between the rotation variation data corresponding to the last 4 revolutions (48 $\omega S30$ correspond to 720° CA×2) and the representative rotation variation data at the time of the misfire is calculated with the coefficient n being changed from 0 to 23, if the misfire occurs during the last two revolutions, at least one of the 24 correlation degrees Sn (N=0, 1, ..., 23) to be obtained becomes smaller than the predetermined value K3.

Further, a description will be made hereinbelow in terms of a third embodiment of the present invention. As described above, in the above-described first and second embodiments, a plurality of rotation variation data $\omega S30i$ are obtained to be compared with the representative rotation variation data $I\omega 30i$ for the determination of misfire. However, these misfire determination methods require complex processes such as storage of the plurality of data. This third embodiment is for performing the misfire determination without storing the plurality of data.

Figure 7:
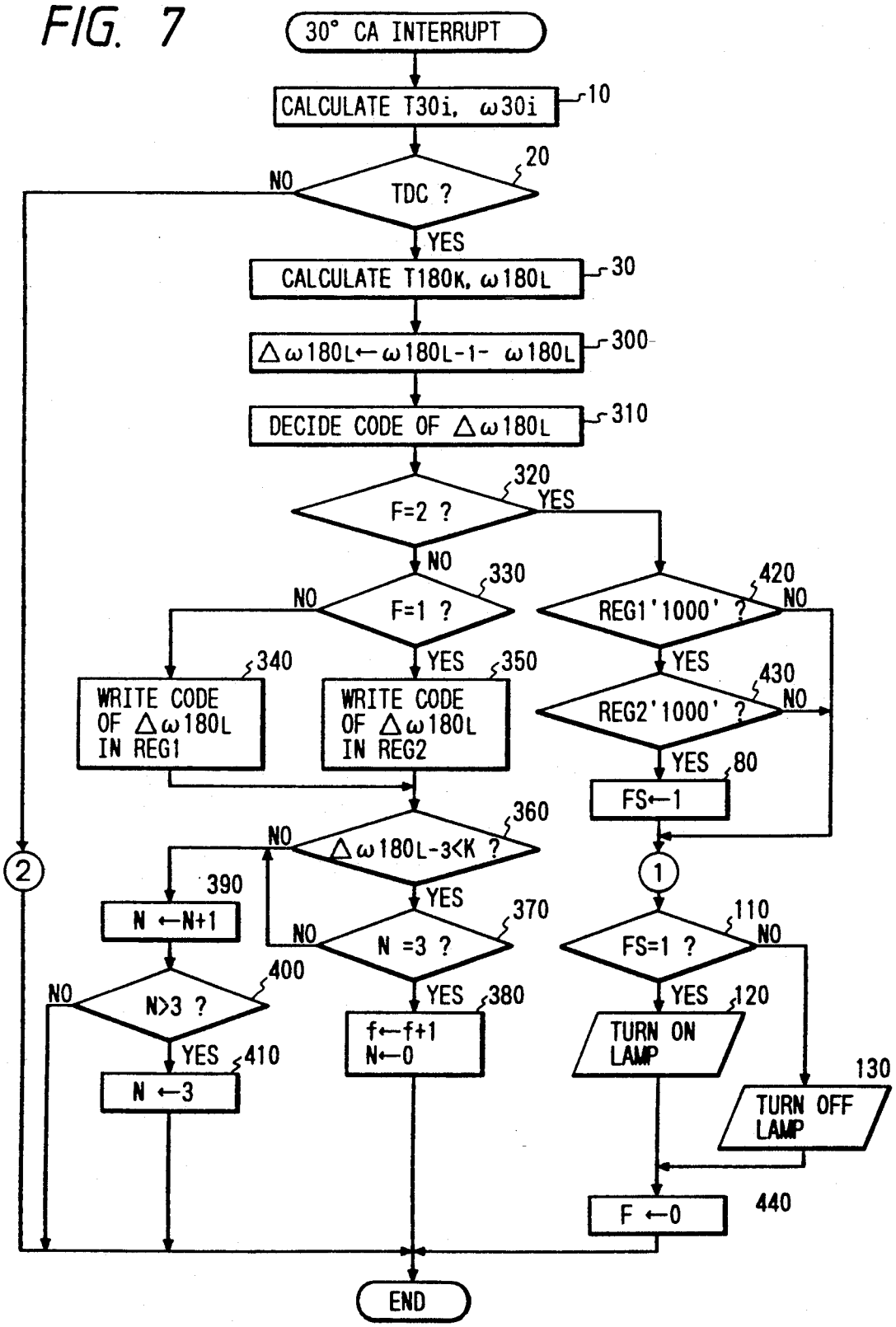
FIG. 7 is a flow chart showing an operation of a misfire detection apparatus according to a third embodiment of this invention.

FIG. 7 is a flow chart showing an operation for the misfire determination according to the third embodiment. Similarly to the FIG. 2 routine, this routine is executed by the interrupt occurring in response to the signal to be generated from the crank angle sensor 4 at every 30° CA. Steps corresponding to those in the FIG. 2 flow chart are marked with the same numerals and the description thereof will be omitted for brevity. In FIG. 7, a step 300 is provided in order to calculate a rotational speed variation $\Delta\omega 108_L$ on the basis of the deviation between the rotational speed $\omega 180_{L-1}$ obtained at the previous TDC timing and the rotational speed $\omega 180_L$ obtained at the current TDC timing. After the execution of the step 300, the operation proceeds to a step 310 to check whether the rotational speed variation $\Delta\omega 180_L$ is a plus value or minus value, in other words, whether the rotational speed $\omega 180_L$ is increasing or decreasing. A step 320 is then executed to check whether a provisional misfire counter f is 2. If f=2, the operational flow goes to a step 420, and if not, the operational flow advances to a step 330 to check whether the provisional misfire counter f is 1. If the answer of the step 330 is affirmative, the operational flow proceeds to a step 350. If the answer of the step 330 is negative, the operational flow goes to a step 340. That is, in the steps 320 and 330, the detection is made in terms of the value of the provisional misfire counter f (one of 0, 1 and 2) so that the process is effected in accordance with the detection value.

Figure 8:
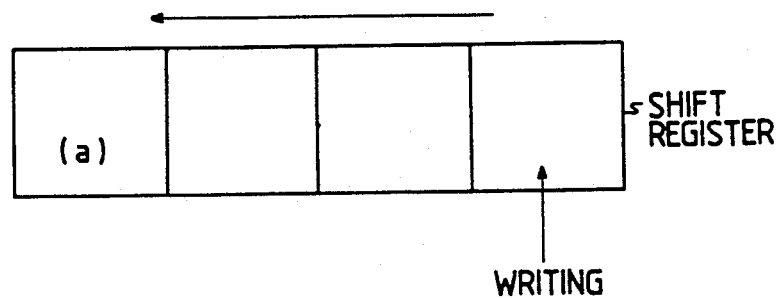
FIG. 8 is an illustration of a code storage register for describing the misfire determination.

The step 340 is provided in order to store the determination result of the step 310 in a code storage register REG1 of the RAM 5a, and then followed by a step 360. More specifically, when the rotational speed variation $\Delta\omega 180_L$ is a plus value, "0" is written in the code storage register REG 1, and when being a minus value, "1" is written therein. In the case a four-cylinder internal combustion engine, the code storage register REG1 is a shift register constructed with 4 bits as illustrated in FIG. 8 and arranged to be shifted in the direction indicated by an arrow so as to always store 4 data.

The step 350 is for similarly writing the determination result of the step 310 in a code storage register REG2 having the same function as the above-mentioned code storage register REG1, thereafter proceeding to the above-mentioned step 360. The step 360 is for checking whether the rotational speed variation $\Delta\omega 180_{L-3}$ obtained at the TDC timing of the 3 times before is smaller than a decision value K (K is a minus value). If the rotational speed variation $\Delta\omega 180_{L-3}$ is smaller than the decision value K, the operational flow goes to a step 370. If not, the operational flow goes to a step 390. That is, the determination result is arranged to be continuously written in the code storage registers REG1 and REG2 until "1" is written at the position indicated by (a) in FIG. 8. More specifically, in the case that the rotational speed variation $\Delta\omega 180_{L-3}$ obtained at the TDC timing of the 3 times before is smaller than the decision value K, "1" is always written at the position (a) in FIG. 8. Further, in the case that the rotational speed variation is negative due to a slight reduction of the rotational speed caused by the running state of the motor vehicle irrespective of the occurrence of misfire, although "1" is similarly written at the position (a) in FIG. 8 since the rotational speed variation $\Delta\omega 180_{L-3}$ obtained at the TDC timing of the 3 times before does not become smaller than the decision value K, the determination is made such that the writing is repeatedly effected with respect to the code storage registers REG1 and REG2.

In the step 370, a cylinder counter N is checked so as to determine whether N=3. If N=3, the operational flow goes to a step 380, and if not, the operational flow goes to a step 390. In the step 380, the cylinder counter N is reset and the provisional misfire counter f is incremented by one, thereafter terminating this routine. On the other hand, in the step 390, the cylinder counter N is incremented by one, then followed by a step 400 to check whether the cylinder counter N is equal to or greater than 3. If the answer of the step 400 is affirmative, a step 410 is executed so that the cylinder counter N is set to 3. After the execution of the step 410, this routine terminates.

Secondly, the processes after the step 420 will be described hereinbelow. In cases where f=2 in the step 320, in other words, when "1" is written at the positions indicated by (a) in FIG. 8 in both the code storage registers REG 1 and REG2, the operational flow goes to the step 420. In the step 420, the code storage register REG 1 is checked so as to determine whether the record of the code is "1000". If so, the operational flow advances to a step 430 to check the code storage register REG 2 to determine whether the record of the code is "1000". If the answer of the step 430 is affirmative, the operational flow advances to a step 80. In the step 80, since the records of the two code storage registers REG1 and REG2 are "1000", that is, because they have the variation patterns inherent to the occurrence of misfire, the determination is made such that misfire has occurred, whereby, as well as in FIGS. 2 and 6 routines, the misfire determination flag FS is set to "1" and the step 80 is then followed by a step 110. Here, if the answers of the steps 420 and 430 are negative, the operational flow jumps up to the step 110. In the step 110, it is checked whether the misfire determination flag FS is set to "1". If so, the operational flow goes to a step 440 after executing a step 120 to turn on the alarm lamp 9. If not, a step 130 follows to turn off the alarm lamp 9, then followed by the step 440. In the step 440, the provisional misfire counter f is reset, thereafter terminating this routine.

As described above, according to this embodiment, since the information relating to whether the rotational speed variation $\Delta\omega 180_L$ has the negative value or the positive value is stored and the misfire determination past is made by checking predetermined records, it is possible to make the misfire determination operation easy and simple.

Figure 9A:
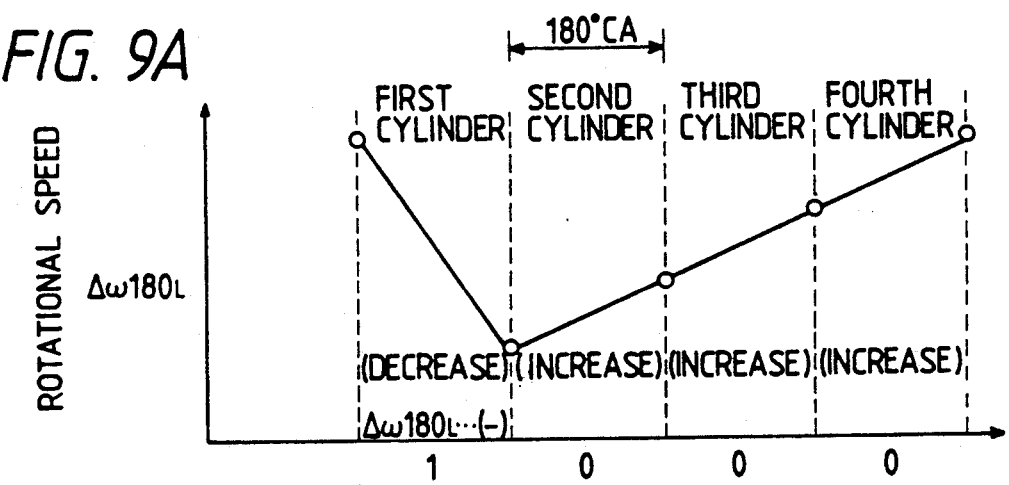
FIGS. 9A and 9B are graphic illustrations of variation characteristics of the average rotational speed when the misfire occurs and when a motor vehicle is running on an irregular road surface.
Figure 9B:
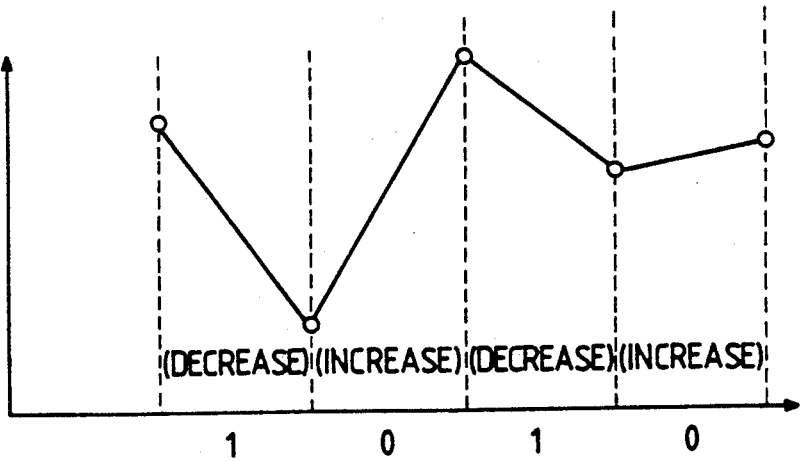

FIG. 9A is a graphic illustration of the variation characteristic of the average rotational speed at the time of the occurrence of the misfire (in one cylinder) and FIG. 9B is a graphic illustration of the variation characteristic of the average rotational speed at the time of the vehicle running on an irregular road surface. As obvious from the illustrations, the record of the code indicating the rotational speed variation becomes "1000" at the time of the occurrence of the misfire. Accordingly, the determination as to whether or not the record of the code of the actual rotational speed variation is "1000" allows an accurate misfire decision without occurrence of the error decision at the time of the vehicle running on an irregular road surface.

Figure 10:
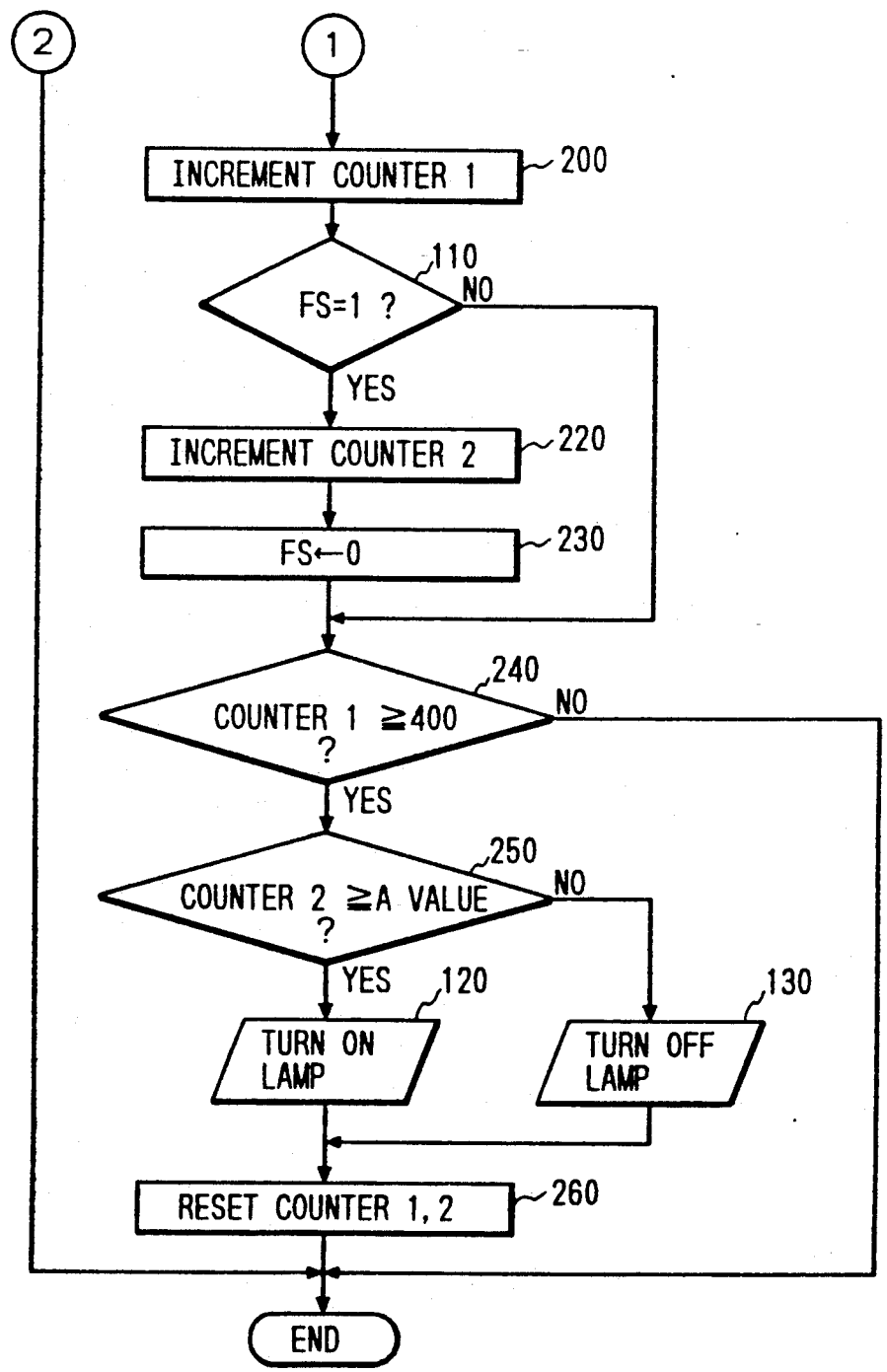
FIG. 10 is a flow chart for describing an operation of a misfire detection apparatus according to a fourth embodiment of this invention.

Although in the first to third embodiments described with reference to FIGS. 2, 6 and 7 a checking operation is made at every 180° CA. (every TDC of each cylinder) in terms of whether the misfire determination flag FS is set or not so as to determine the occurrence of misfire and turn on the alarm lamp 9 when it is in the set state, it is also appropriate that, for increasing the misfire determination accuracy, the alarm lamp 9 is arranged to turn on when the number of settings of the misfire determination flag FS exceeds a predetermined value while the internal combustion engine rotates 200 times (for example). This operation will be described hereinbelow as a fourth embodiment with reference to FIG. 10. FIG. 10 illustrates processes to be executed after the step 100 of the FIG. 2 or 6 flow chart or after the step 440 of the FIG. 7 flow chart.

In FIG. 10, a step 200 is executed in order to increment a counter 1. This counter 1 is for integrating (totalizing) the revolutions of the internal combustion engine and is arranged to be incremented at every 180° CA., thereby indicating 200 revolutions of the engine when the value of the counter 1 reaches 400. A step 110 follows to check whether the misfire determination flag FS is set or not. If so, a step 220 is executed to increment a counter 2 for integrating the number of times of the settings of the misfire determination flag FS, then followed by a step 230 to reset the misfire determination flag FS. On the other hand, if the answer of the step 110 is negative, the operational flow jumps over the steps 220 and 230 to proceed to a step 240 to check whether the value of the counter 1 reaches 400, that is, check whether the engine rotates 200 times. If not reaching 400, this routine terminates. On the other hand, if reaching 400, the misfire determining process is performed as follows. A step 250 is executed in order to check whether the value of the counter 2 for counting the number of times of the settings of the misfire determination flag FS reaches a predetermined value (for example, 50). If reaching the predetermined value, a step 120 is executed to turn on the alarm lamp 9 under the decision that misfire has occurred. If not, that is, when the number of times of the setting of the flag FS is below the predetermined value, the misfire decision is not made, whereby a step 130 follows to turn off the alarm lamp 9. In a subsequent step 260, the counters 1 and 2 are reset, and then this routine terminates. This operation allows more accurate misfire determination.

As described above, according to the first to fourth embodiments, the respective rotation data of the rotation data train representing the record of the actual engine rotational speed at a predetermined interval are compared with the respective reference data of the reference rotation data train representing the reference record of the rotational speed at the time of the occurrence of misfire so as to determine the misfire of the engine on the basis of the comparison results. Thus, it is possible to accurately determine the occurrence of the misfire irrespective of the rotation variation due to the vehicle running on an irregular road surface, thereby permitting the improvement of the controllability.

Further, a description will be made hereinbelow in terms of a fifth embodiment of the present invention. One feature of this fifth embodiment is to use, in place of the predetermined representative rotation record used for the misfire determination in the above-described embodiments, a rotation record obtained by performing a predetermined process with respect to the actually measured rotation record.

Figure 11:
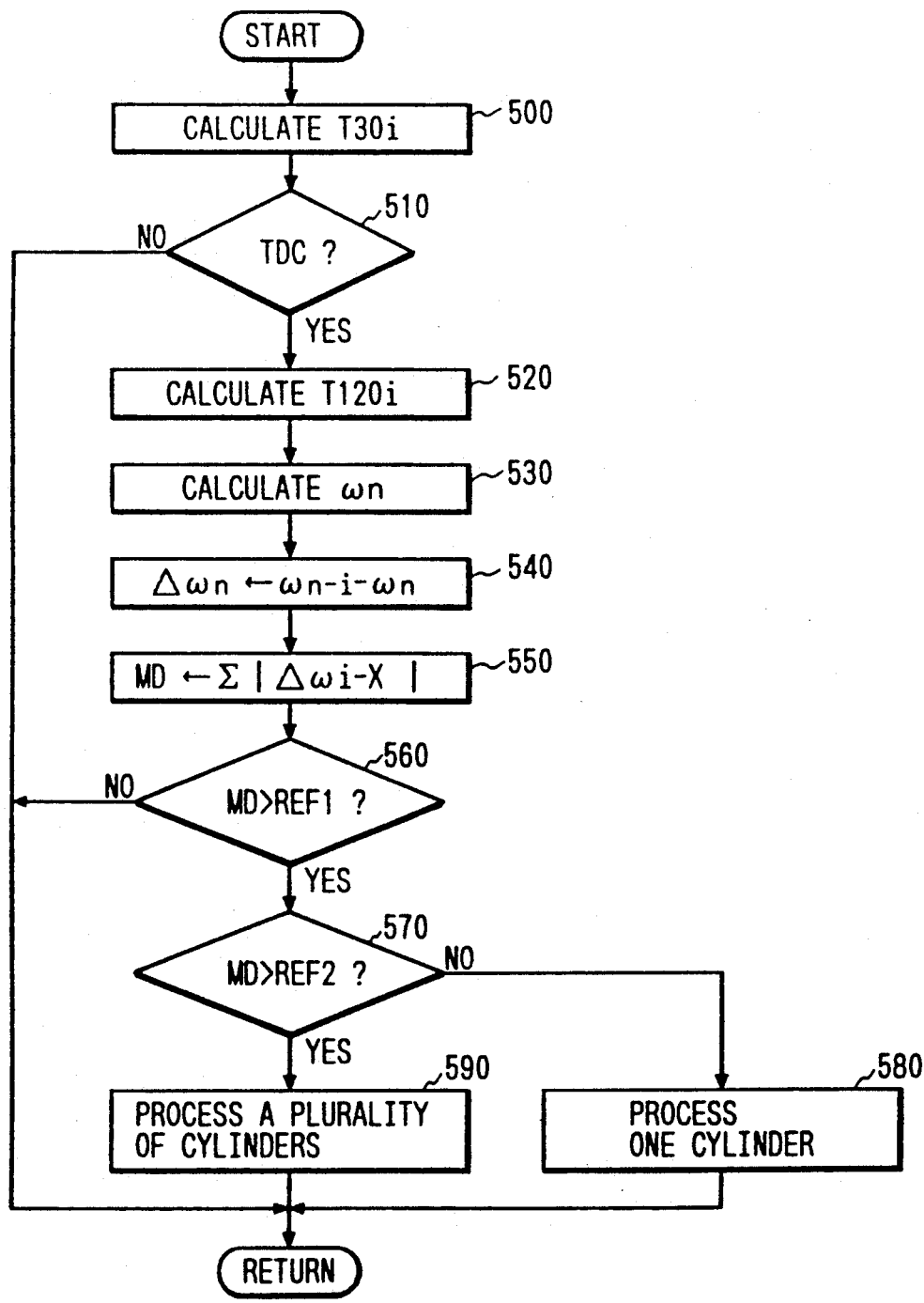
FIG. 11 is a flow chart showing an operation of a misfire detection apparatus according to a fifth embodiment of the present invention.

FIG. 11 is a flow chart showing the operation of this fifth embodiment. This operation will be effected with the interrupt occurring at every predetermined crank angle (for example, 30° CA) in response to the output signal of the crank angle sensor 4. In FIG. 11, the operation starts with a step 500 to calculate the time T30i, taken for the rotation of 30° CA, on the basis of the deviation between the previous interrupt time and the present interrupt time. A subsequent step 510 is for checking whether the present interrupt timing corresponds to the TDC. If not, this routine terminates. On the other hand, if the answer of the step 510 is affirmative, a step 520 follows to accumulate 4 data of the time T30i obtained in the current process and the times T30$_{i-1}$, T30$_{i-2}$, T30i-3 obtained in the 3 successive processes executed immediately before the current process to calculate the time T120i necessary for the rotation of 120° CA. Further, a step 530 is executed to calculate the average rotational speed $\omega_n$ at the interval of the crank angle of 120° CA. More specifically, the inverse number of the time T120i obtained in the previous step 520 is calculated and used as the average rotational speed $\omega_n$. A step 540 is provided in order to calculate an average rotational speed variation $\Delta\omega_n$ in accordance with the following equation (5), i.e., on the basis of the deviation between the current average rotational speed $\omega_n$ and the average rotational speed $\omega_{n-1}$ obtained at the previous TDC timing.

$$\Delta\omega_n = \omega_{n-1} - \omega_n \quad (5)$$

In this equation (5), the average rotational speed variation $\Delta\omega_n$ is a variation of the average rotational speed of the cylinders which successively take the expansion strokes.

In a subsequent step 550, the average deviation MD of the average rotational speed variation $\Delta\omega_n$ is obtained using the one-cycle data of the average rotational speed variation $\Delta\omega_n$ calculated in the step 540. More specifically, since in this embodiment in a six-cylinder internal combustion engine the average rotational speed $\omega_n$ is obtained at every 120° CA, the number of the data of the average rotational speed variation $\Delta\omega_n$ is 6, and the average deviation MD is derived in accordance with the following equation (6).

$$MD = \Sigma |\Delta\omega_i - X| \quad (6)$$

where $\Sigma$ represents the accumulation of i=1 to 6 and X designates the average value of 6 average rotational speed variations $\Delta\omega n$ which can be obtained by an equation $X = \Sigma\Delta\omega_i / 6$.

In the next step 560, the average deviation MD calculated in the previous step 550 is compared with a first decision value REF1. If MD is greater than REF1, the operational flow advances to a step 570. If not, the operational flow returns to the main routine under the decision that misfire has not occurred. In the step 570, similarly the average deviation MD is compared with a second decision value REF 2. If MD is greater than REF2, the operational flow goes to a step 590 under the decision that a plurality of cylinder are in the misfire state. If not, the operational flow goes to a step 580 under the decision that only one cylinder is in the misfire state. Here, the second decision value REF 2 is set to be greater than the first decision value REF1.

The step 580 is for turning on an alarm lamp 12 to inform the driver that one cylinder is in the misfire state, and the step 590 is for turning on the alarm lamp 12 with a different lighting system to inform the driver that the plurality of cylinders are in the misfire state. These steps 580 and 590 are for realizing the so-called fail-safe function. Thereafter, this routine terminates.

Figure 12:
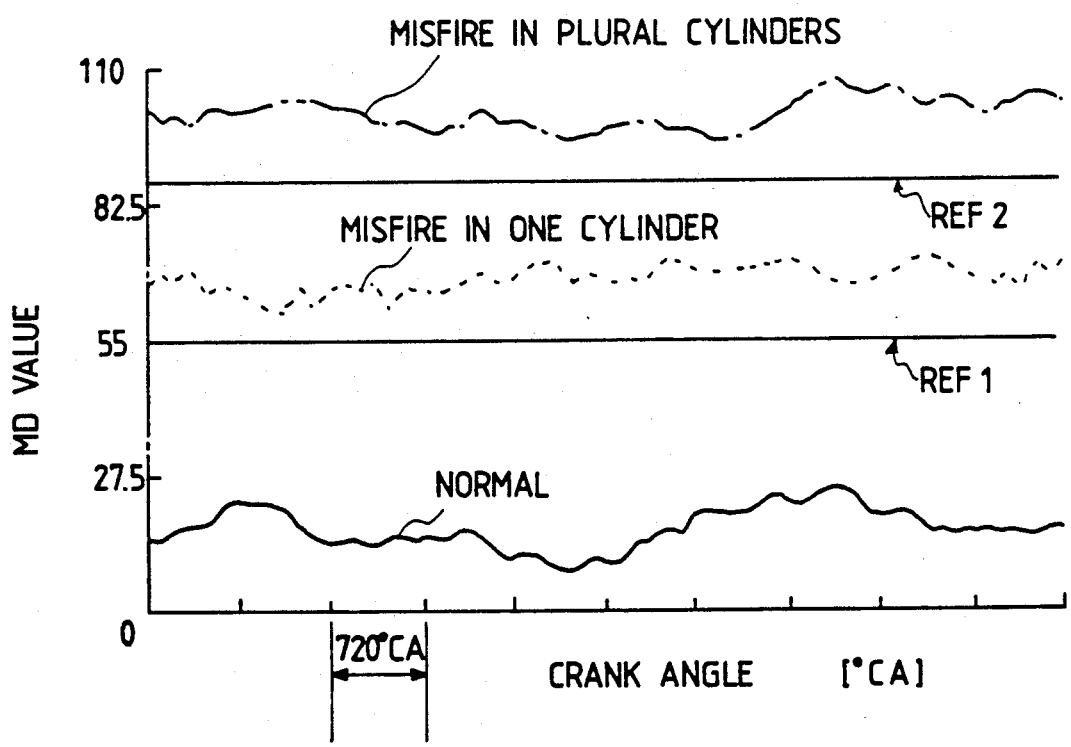
FIG. 12 is a graphic diagram showing the average deviation characteristics in correspondence with misfire occurrence states.

Further, this embodiment will be described with reference to a characteristic of the average deviation MD as illustrated in FIG. 12. In FIG. 12, the horizontal axis represents the crank angle, the vertical axis indicates the average deviation, and the solid line represents the characteristic at the time of no occurrence of the misfire, the dotted line indicates the characteristic in the case of the occurrence of the misfire in only one cylinder and the chain line denotes the characteristic in the case of the occurrence of the misfire in a plurality of cylinders. As clear from the illustration, in the case of the occurrence of the misfire in the plurality of cylinders as compared with the case of the occurrence of the misfire in only one cylinder, the average deviation MD fluctuates with higher levels. Thus, the misfire decision value is set taking into account such a fluctuation characteristic. That is, with the first and second decision values REF1 and REF2 being set in accordance with the characteristic shown in FIG. 12, it is possible to accurately perform the determination (distinction) between no occurrence of misfire, the occurrence of misfire in the plurality of cylinders and the occurrence of misfire in only one cylinder.

Figure 13:
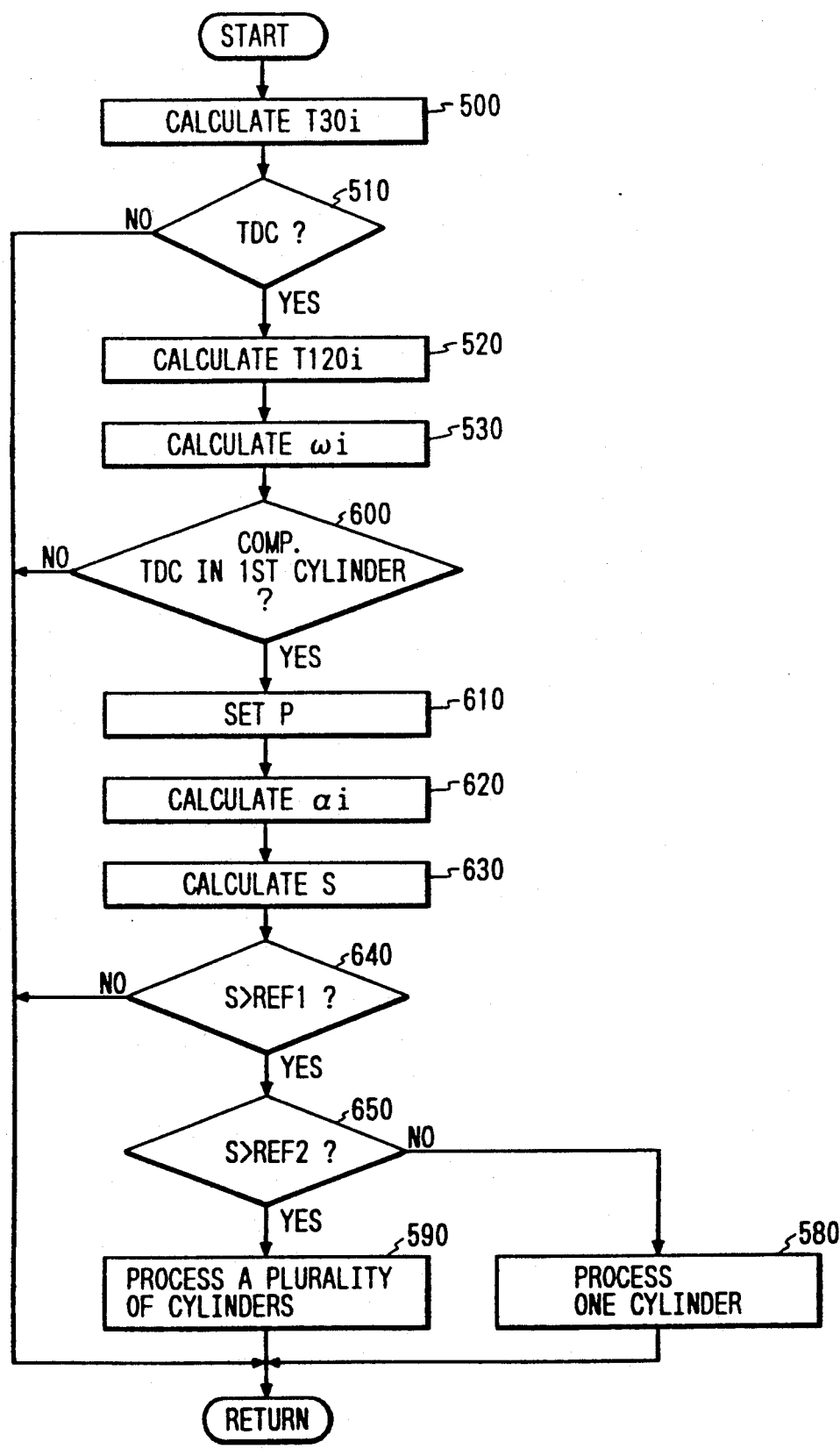
FIG. 13 is a flow chart showing an operation of a misfire detection apparatus according to a sixth embodiment of this invention.

A description will be made hereinbelow with reference to FIG. 13 in terms of a sixth embodiment of this invention. One difference between the fifth embodiment illustrated in FIG. 11 and the sixth embodiment is to set a regression equation on the basis of the average rotational speed $\omega_n$ in accordance with the least square without calculating the average deviation MD to determine the misfire in accordance with the deviation between a value (estimation value) obtained by the set regression equation and the average rotational speed $\omega_n$. Here, as well as the FIG. 11 routine, the FIG. 13 routine is executed at every predetermined crank angle, and steps corresponding to those in the FIG. 11 routine are marked with the same numerals and the description thereof will be omitted for brevity.

In a step 600, it is checked whether the current execution timing is the compression TDC of the first cylinder. If not, the operational flow returns to the step 510. On the other hand, if the first cylinder is at the compression TDC. A step 610 follows to obtain constants a and b in accordance with the following equations (7) and (8) to set a regression equation P by using the average rotational speed ωi (i=1 to 6) obtained for the respective cylinders in the step 530. Here, the regression equation P is defined with Y=a+b·X and, as generally known, set so that the accumulation value of the absolute values of the deviations between the actual average rotational speed ωi (i=1 to 6, and corresponding to the above-mentioned $\omega_n$) and the estimation value obtained for each cylinder in accordance with the regression equation P take a minimum value.

$$b=(6\cdot\Sigma(X\cdot Y)-\Sigma X\cdot\Sigma Y)/(6\cdot\Sigma X^2-(\Sigma X)^2) \quad (7)$$

$$a=(\Sigma X-b\cdot\Sigma Y)/6 \quad (8)$$

A subsequent step 620 is provided in order to calculate an estimation value αi (i=1 to 6) for each cylinder (in this embodiment, the number of the cylinders is 6) in accordance with the regression equation P. A step 630 is for obtaining the accumulation value S on the basis of the average rotational speed ωi and the estimation value αi. More specifically, the accumulation value S is the accumulation value of the absolute values of the deviations between the average rotational speed ωi and the estimation value αi, and is obtained in accordance with the following equation (9).

$$S=\Sigma|\omega i-\alpha i| \quad (9)$$

where Σ represents the accumulation of i=1 to 6.

In a step 640, the accumulation value S is compared with the first decision value REF1. If S is less than REF1, the operational flow returns to the step 510. If S is greater than REF1, the operational flow goes to a step 650 to compare the accumulation value S with the second decision value REF2. If S is greater than REF2, the operational flow advances to a step 590 under the decision that a plurality of cylinders are in the misfire states. On the other hand, if S is not greater than REF2, the operational flow goes to a step 580 under the decision that only one cylinder is in the misfire state. In the steps 580 and 590, the operations similar to the steps 580 and 590 in the FIG. 11 routine are performed. Thereafter, this routine terminates.

Figure 14A:
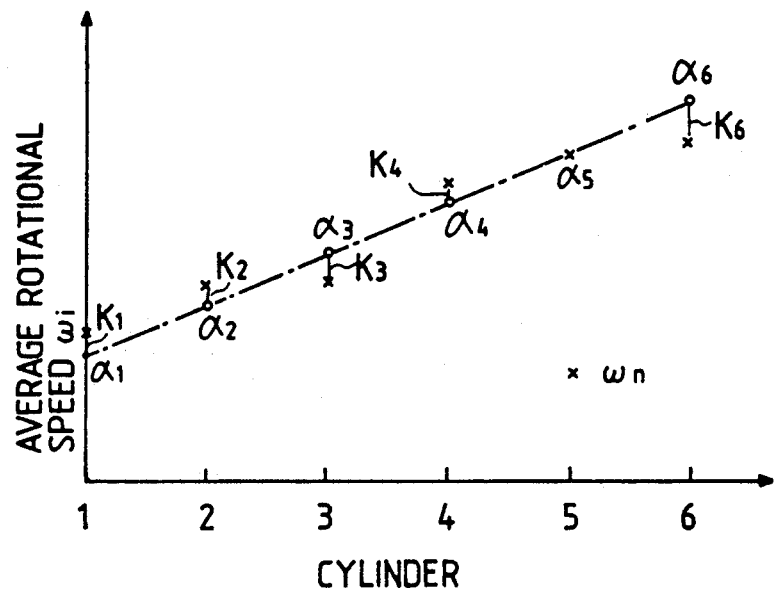
FIGS. 14A and 14B are graphic illustrations of characteristics of the average rotational speed at the time of the normal ignition and at the time of occurrence of the misfire.

Here, a description will be made hereinbelow with reference to FIGS. 14A and 14B in terms of the regression equation P and the accumulation value S. FIG. 14 is a graphic illustration obtained by plotting the average rotational speeds ωi derived in the step 530 for the respective cylinders. FIG. 14A shows the characteristic at the time of the normal condition and FIG. 14B illustrates the characteristic in the case of the occurrence of the misfire in the third cylinder, where the horizontal axis represents the respective cylinders and the vertical axis indicates the average rotational speeds ωi.

Figure 14B:
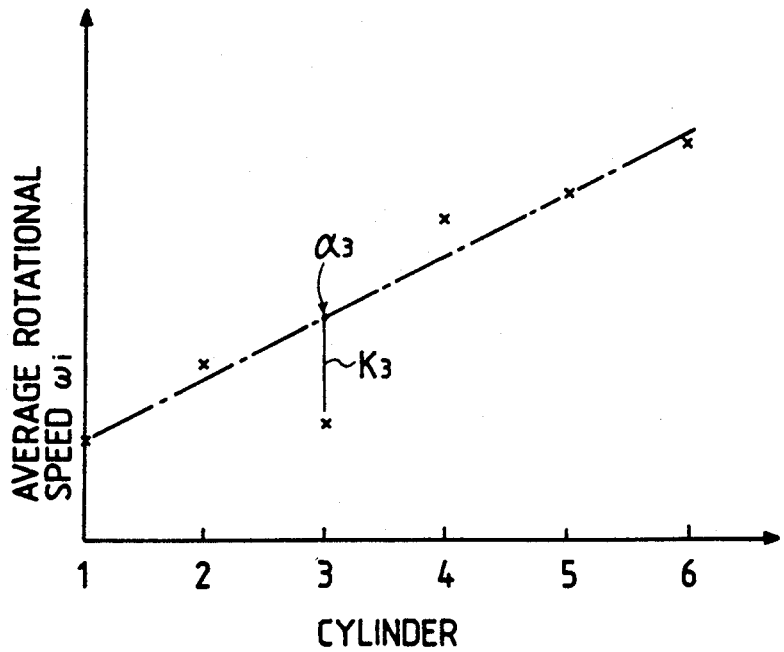
Figure 15:
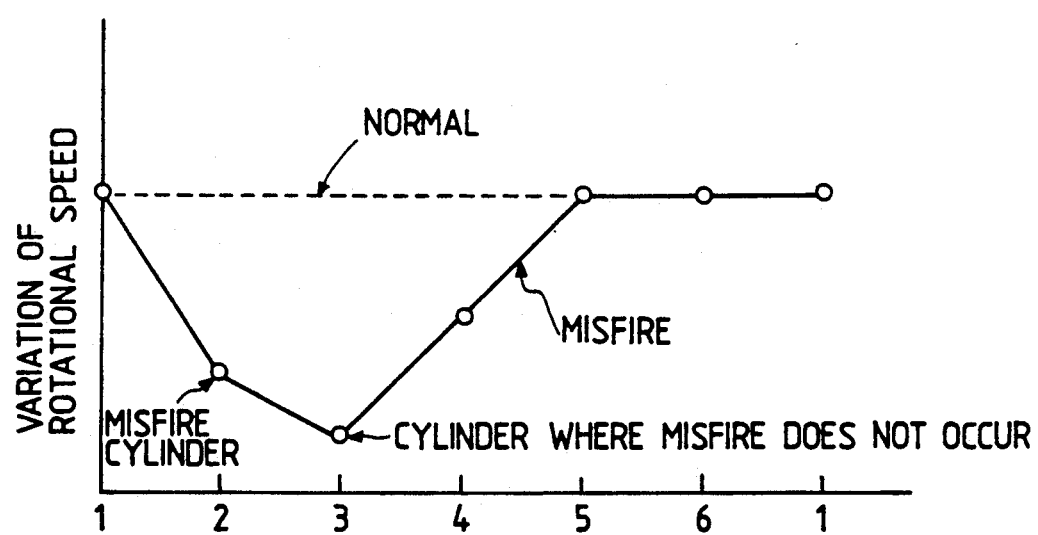
FIG. 15 is a graphic diagram showing the variation of the rotational speed of an internal combustion engine.

In FIGS. 14A and 14B, the regression equation P takes linear lines as indicated by dashed lines (chain lines) whereby the estimation value αi can be obtained at every cylinder. Thus, the accumulation value S is the sum of the absolute values of the deviations between the average rotational speed ωi and the estimation value αi, and hence, it can be obtained by summing up K1 to K6 (for example) in FIG. 14A. Accordingly, as indicated by K3 in FIG. 14B the absolute value of the deviation between the average rotational speed ωi and the estimation value αi becomes great at the time of the occurrence of the misfire and hence the accumulation value S becomes great, whereby it is possible to determine the occurrence of the misfire. Further, at this time, in addition to the average deviation MD, the accumulation value S becomes greater in the case of the occurrence of the misfire in a plurality of cylinders as compared with the occurrence of the misfire in only one cylinder. If the regression equation is set on the basis of the average rotational speed ωi, irrespective of the average deviation MD and the accumulation value S of the absolute values of the deviations between the estimation value α obtained in accordance with the regression equation, and the average rotational speed ωi is compared with the first and second decision values REF1 and REF2, it is possible to accurately perform the determination (distinction) between no occurrence of misfire, the occurrence of the misfire in a plurality of cylinders and the occurrence of the misfire in only one cylinder. FIG. 15 shows the rotational speed variation of the respective cylinders.

In addition, since a large amount of unburnt gas is introduced into the catalytic converter in the case of the occurrence of the misfire in a plurality of cylinders as compared with the occurrence of the misfire in only one cylinder, the deterioration of the catalytic converter is accelerated and the harmful component of the exhaust gas is increased. Since the above-described embodiments allow the distinction between the occurrence of the misfire in a plurality of cylinders and the occurrence of the misfire in only one cylinder, in the case of continuous occurrences of the misfire in the plurality of cylinders, it is appropriate to perform an adequate operation such as a process to immediately cut the fuel supply to the cylinders.

As described above, according to the fifth and sixth embodiments the actually measured values at a predetermined crank angle in the expansion stroke of each cylinder are compared with the first decision value and the second decision value greater than the first decision value, so that the occurrence of the misfire in a plurality of cylinders is determined when the actually measured value is greater than the first and second decision values, and the occurrence of the misfire in only one cylinder is determined when the actually measure value is greater than the first decision value and smaller than the second decision value. Thus, it is possible to accurately detect misfire in any misfire occurrence states and further to accurately perform the distinction between the occurrence of the misfire in only one cylinder and the occurrence of the misfire in a plurality of cylinders, thereby permitting adequate countermeasures against a misfire occurrence state.

It should be understood that the foregoing relates to only preferred embodiments of the present invention, and that it is intended to cover all changes and modifications of the embodiments of this invention herein used for the purposes of the disclosure, which do not constitute departures from the spirit and scope of the invention.

What is claimed is:

1. A misfire detecting apparatus for a multi-cylinder internal combustion engine comprising:
   signaling means for generating and outputting a rotational signal at every predetermined rotational angle of said engine;
   calculating means for receiving said rotation signal from said signaling means and calculating a value, said value being determined by measuring a duration of a rotation of said engine by said predetermined rotational angle in an expansion stroke of each of said cylinders of said engine; and determining means for determining an occurrence of no misfires, a misfire in a single cylinder, or a plurality of misfires in a plurality of said cylinders by utilizing said value, wherein said determining means determines an occurrence of a plurality of misfires in a plurality of said cylinders when said value is greater than a first decision value and greater than a second decision value, said second decision value being greater than said first decision value.

2. An apparatus as claimed in claim 1, wherein said value is an average rotation time of said engine in said expansion stroke of each of said cylinders.

3. An apparatus as claimed in claim 1, wherein said value is a rotational speed of said engine in said expansion stroke of each of said cylinders.

4. An apparatus as claimed in claim 1, further comprising plural misfire indication means for indicating that a plurality of misfires have occurred in a plurality of cylinders.

5. A misfire detecting apparatus for a multi-cylinder internal combustion engine, comprising:

signaling means for generating and outputting a rotation signal at every predetermined rotational angle of said engine;

calculating means for receiving said rotation signal from said signaling means and calculating a value, said value being determined by measuring a duration of a rotation of said engine by said predetermined rotational angle in an expansion stroke of each of said cylinders of said engine; and determining means for determining an occurrence of no misfires, a misfire in a single cylinder, or a plurality of misfires in a plurality of said cylinders by utilizing said value;

wherein said calculating means comprises, time means for receiving said rotation signal and calculating said duration of a rotation of said engine by said predetermined rotational angle in said expansion stroke of each of said cylinders by utilizing said rotational signal, inverting means for obtaining an inverse number of said duration, so as to calculate a present average rotational speed of said engine for said predetermined rotational angle, variation means for calculating an average rotational speed variation based on a deviation between a previously calculated average rotational speed and said present average rotational speed, and average deviation means for obtaining an average deviation between said previously calculated average rotational speed and said present average rotational speed based on said average rotational speed variation, said average deviation being said value calculated by said calculating means.

* * * * *